US008949451B2

United States Patent
Einarsson et al.

(10) Patent No.: US 8,949,451 B2
(45) Date of Patent: Feb. 3, 2015

(54) COMBINED BROADCAST AND UNICAST DELIVERY

(75) Inventors: Torbjorn Einarsson, Stockholm (SE); J. Fritz Barnes, Alameda, CA (US)

(73) Assignee: MobiTV, Inc., Emeryville, CA (US)

(*) Notice: Subject to any disclaimer, the term of this patent is extended or adjusted under 35 U.S.C. 154(b) by 131 days.

(21) Appl. No.: 13/535,870

(22) Filed: Jun. 28, 2012

(65) Prior Publication Data

US 2013/0290555 A1    Oct. 31, 2013

Related U.S. Application Data

(60) Provisional application No. 61/639,566, filed on Apr. 27, 2012.

(51) Int. Cl.
   *G06F 15/16*   (2006.01)

(52) U.S. Cl.
   USPC ............ 709/231; 709/228; 370/485; 725/38; 725/62

(58) Field of Classification Search
   CPC ............. G06F 15/16; G06F 17/30017; H04N 21/6125; H04N 21/845; H04N 21/6405; H04N 21/6408; H04N 21/6131; H04L 29/06027
   USPC ....................................................... 709/231
   See application file for complete search history.

(56) References Cited

U.S. PATENT DOCUMENTS

| | | | |
|---|---|---|---|
| 2004/0139480 A1* | 7/2004 | Delpuch et al. | 725/135 |
| 2006/0244824 A1 | 11/2006 | Debey | |
| 2007/0147411 A1* | 6/2007 | Bijwaard et al. | 370/432 |
| 2007/0156815 A1* | 7/2007 | Mate et al. | 709/204 |
| 2009/0198827 A1* | 8/2009 | Hughes | 709/231 |
| 2009/0291631 A1* | 11/2009 | Xue et al. | 455/3.01 |
| 2010/0138876 A1* | 6/2010 | Sullivan et al. | 725/62 |
| 2010/0169504 A1 | 7/2010 | Gabin et al. | |
| 2010/0211689 A1 | 8/2010 | Bijwaard et al. | |
| 2010/0325666 A1 | 12/2010 | Wiser et al. | |
| 2011/0023072 A1 | 1/2011 | Hodzic et al. | |
| 2011/0045785 A1 | 2/2011 | Sutskover et al. | |
| 2011/0255458 A1* | 10/2011 | Chen et al. | 370/312 |
| 2012/0191548 A1* | 7/2012 | Des Jardins et al. | 705/14.68 |
| 2013/0067109 A1* | 3/2013 | Dong et al. | 709/231 |

FOREIGN PATENT DOCUMENTS

WO    2013163551 A1    10/2013

OTHER PUBLICATIONS

"HTTP Live Streaming Overview", *Apple, Inc.*, (2011),1-36.

(Continued)

*Primary Examiner* — Tauqir Hussain
(74) *Attorney, Agent, or Firm* — Kwan & Olynick LLP (57) ABSTRACT

Described herein are techniques for facilitating combined broadcast and unicast delivery of content. According to various embodiments, a media stream from a content provider may be received at a unicast server and at a broadcast server. The media stream may comprise a plurality of media stream fragments. A relative delay may be introduced into the media stream at the broadcast server such that media stream fragments transmitted from the broadcast server are delayed relative to media stream fragments transmitted from the unicast server. The media stream fragments may be transmitted to a user device. The user device may be operable to switch between receiving the media stream fragments from the unicast server and the broadcast server.

13 Claims, 4 Drawing Sheets

(56) References Cited

OTHER PUBLICATIONS

Stockhammer, Thomas "Dynamic Adaptive Streaming over HTTP—Design Principles and Standards", *Qualcomm Incorporated*, [Online]. Retrieved from the Internet: < http://www.w3.org/2010/11/web-and-tv/papers/webtv2_submission_64.pdf >, Accessed on Jul. 17, 2012,3 pgs.

Schulzrinne, H. et al., "RTP: A Transport Protocol for Real-Time Applications", *The Internet Society*, (2003),1-89.

"[MS-RTSP]: Real-Time Streaming Protocol (RTSP) Windows Media Extensions", *Microsoft Corporation*, (Jul. 5, 2012),1-142.

Pantos, R et al., "HTTP Live Streaming: draft-pantos-http-live-streaming-08", [Online]. Retrieved from the Internet: < http://tools.ietf.org/pdf/draft-pantos-http-live-streaming-08.pdf >, Accessed on Jul. 17, 2012,(Mar. 2012),1-34.

Schulzrinne, H et al., "Real Time Streaming Protocol (RTSP)", *The Internet Society*, [Online]. Retrieved from the Internet: < http://tools.ietf.org/pdf/draft-ietf-mmusic-rfc2326bis-29.pdf >, Accessed on Jul. 17, 2012,(Feb. 1998),74 pgs.

"Int'l Application Serial No. PCT/US2013/038428, Search Report & Written Opinion mailed Sep. 20, 2013", 8 pgs.

* cited by examiner

COMBINED BROADCAST AND UNICAST DELIVERY

CROSS-REFERENCE TO RELATED APPLICATIONS

This application claims priority under 35 U.S.C. §119 to Provisional U.S. Patent Application No. 61/639,566 by Einarsson and Barnes, filed on Apr. 27, 2012, titled "Combined Broadcast and Unicast Delivery", which is incorporated by reference herein in its entirety and for all purposes.

TECHNICAL FIELD

The present disclosure relates to broadcast and unicast delivery.

DESCRIPTION OF RELATED ART

A variety of broadcast media delivery mechanisms are available. In some instances, media content may be broadcast to devices using RTP-based streaming. A variety of unicast media delivery mechanisms are also available. HTTP streaming as well as RTSP/RTP-based streaming can be used to deliver individual media streams to client devices. Broadcast and unicast both have a variety of benefits and drawbacks and consequently both are used in different environments.

However, mechanisms for allowing effective switching between broadcast and unicast delivery mechanisms are limited. Consequently, techniques and mechanisms of the present invention allow for improved switching between broadcast and unicast delivery mechanisms.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A system is provided to allow for seamless or near seamless transitions between broadcast distributed media and unicast delivered media. Any media distribution mechanism could be modified to allow for seamless or near seamless transitions. In some examples, media is divided into fragments or segments and sent to broadcast servers and unicast servers. Relative delay is introduced between the broadcast servers and the unicast servers so that broadcast transmission fragments are one or more fragments behind unicast transmission fragments to provide a client device time to request and retrieve unicast fragments if the corresponding broadcast fragments are not available.

Example Embodiments

According to various embodiments, media content may be transmitted via various transport techniques such as broadcast, unicast, and multicast. Broadcast technologies may include any technologies configured to transmit information in an ongoing fashion, even in the absence of communications or specific requests for the information from the receiving device or devices. At any particular time, information transmitted by broadcast technologies may be received by a single device, by more than one device, or by no devices at all, depending on factors such as the type of broadcast technology used, the network conditions of the network via which the information is broadcast, or the conditions of the client device or devices. Unicast technologies may include any technologies configured for transmitting messages in a point-to-point fashion over a network. That is, a server or other machine may transmit a message to a particular device in communication with the server via a network.

According to various embodiments, multicast technologies may include any technologies for transmitting data for a set of destinations. Many techniques described herein are described with respect to unicast and broadcast technologies in general or with respect to particular unicast and broadcast technologies. However, techniques are generally applicable to a wide variety of transport types. For example, techniques may be applicable to an IP multicast arrangement in which a receiver elects to receive packets. As another example, techniques may be applicable to a broadcast arrangement in which a receiver can tune into a particular frequency or other content source to receive data. Accordingly, transport types such as multicast may be alternatives to broadcast or unicast or may be included within the scope of broadcast or unicast, depending on the particular technologies or network being used.

Hypertext Transfer Protocol (HTTP) unicast streaming is a convenient mechanism for distributing both media content such as near-live streaming video and video clip content. Individual streams are selected and transported to each user. In contrast to progressive download, media content is partitioned into fragments or segments that are delivered as separate files or byte-ranges of a bigger file. A variety of fragment streams can be encoded at different quality levels to allow selection among variants in near real-time. The uniform resource locators (URLs) of the segments are typically provided in a manifest file which either contains a template URL pattern or an explicit list of segment URLs. Fragment-based streaming can leverage existing HTTP servers and content delivery network (CDN) networks and cause considerably fewer problems with firewalls compared to RTP streaming. There is therefore a trend of moving away from Real Time Streaming Protocol/Real-time Transport Protocol (RTSP/RTP)-based streaming towards HTTP streaming. Strong efforts in this direction include HTTP Live Streaming (HIS) and 3GPP's and MPEG's DASH (Dynamic Adaptive Streaming over HTTP).

RTP-based multicast streaming over broadcast networks remains prevalent in particular environments. 3GPP's Multimedia Broadcast Multicast Services (MBMS) standard has relied on RTP-based streaming for video distribution. In addition, there is a download/file-distribution mode in MBMS using the File Delivery over Unidirectional Transport (FLUTE) protocol, still using IP multicast. Example use cases for this include distribution of electronic program guide data and data files, such as sports statistics.

With the introduction of MBMS in $4^{th}$ generation cellular LTE networks, interest in MBMS is increasing, particular in a rendition referred to as "eMBMS". The live video distribution mechanism using RTP is still in the standard, but eMBMS allows MBMS to distribute video and other continuous media using DASH-compatible media and metadata packetization. There is thus a means for broadcast distribution of DASH in addition to the standard unicast HTTP-based distribution of DASH.

However, mechanisms for switching between broadcast and unicast distributions such as broadcast and unicast distributions of DASH are limited or unavailable. In particular, since the full network may not be broadcast-enabled, it is important that a session be allowed to continue even when switching between broadcast and unicast distributions.

MBMS has support for point-to-point repair over unicast. It also has a switch between point-2-point and broadcast transmission depending on the number of users in a cell. However, this will not make it possible to transition between a network which is not MBMS-aware, such as a less advanced cellular or WLAN network, and an MBMS network.

According to various embodiments, techniques and mechanisms described herein allow for seamless or near seamless transitions between broadcast-distributed segmented media and corresponding transport of the same media in a unicast manner (e.g., using HTTP). In some instances, transport of the same media in a unicast manner may allow for adaptive selection of the appropriate bit-rate variant depending on network conditions. According to various embodiments, existing file-based media distribution mechanisms may be modified according to techniques described herein to allow for seamless switching. Media data divided into short interval segments can be sent via broadcast (BC) or unicast (UC). This includes distributing DASH media segments, and possibly the manifest, over a broadcast network and combining this with HTTP-based DASH sessions over unicast network in a seamless manner.

According to various embodiments, the same URL or set of URLs may be used to locate the segments on both distribution channels. However, the broadcast transmission of one or more segments may be delayed to facilitate seamless transitions.

In broadcast mode, the client may act as a passive receiver of segments delivered via a broadcast link established using a file distribution protocol such as FLUTE. If the combination of reception quality and Forward Error Correction (FEC) is sufficient, mostly or entirely fault-free segments will be delivered to a reception buffer at the client. Then, the media player can read segments from the buffer, decode them, and play them.

Figure 1:
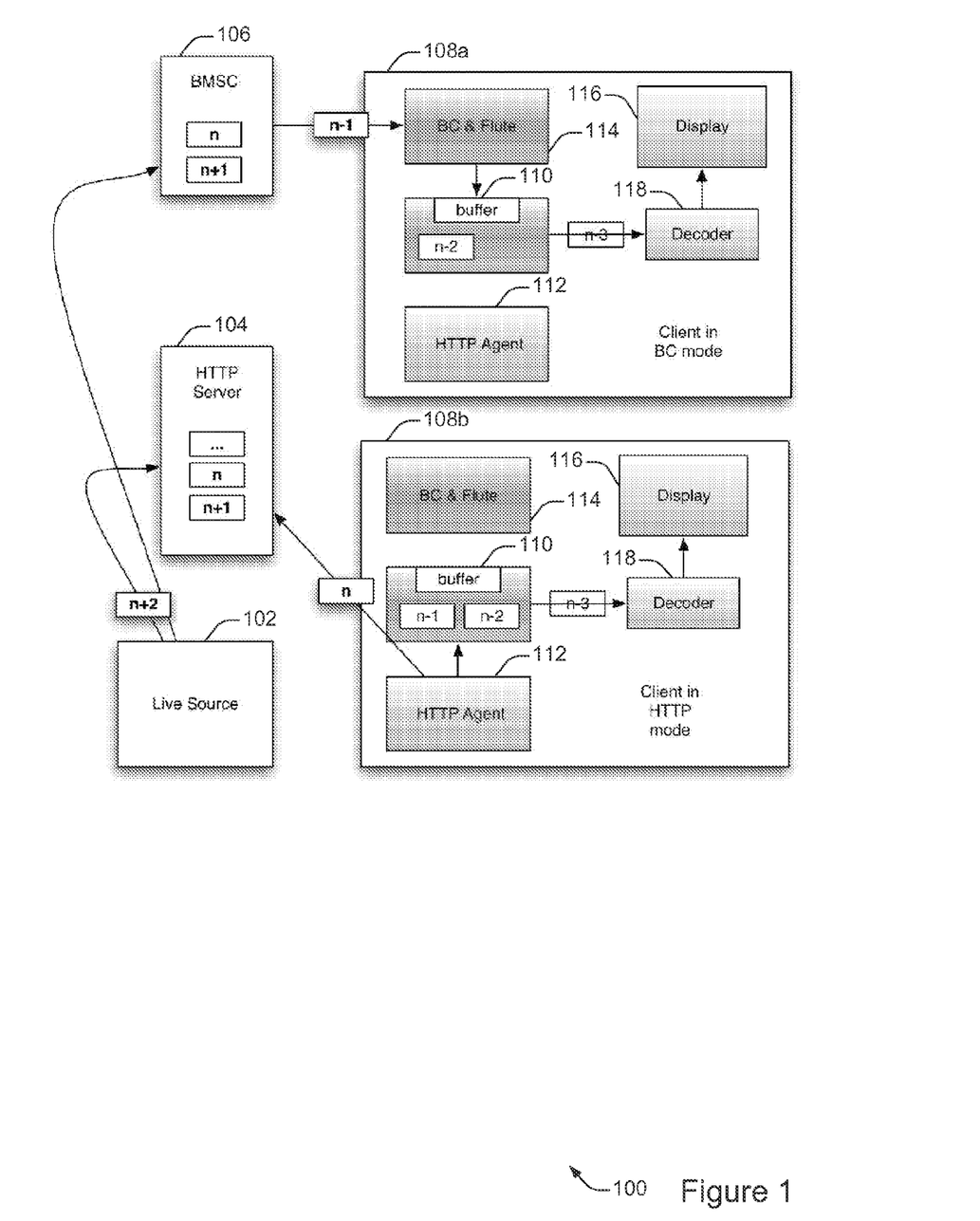
FIG. 1 illustrates examples systems that can be used with various techniques and mechanisms of the present invention.

FIG. 1 illustrates one example of a system that can be used with various techniques and mechanisms of the present invention. According to various embodiments, the system shown in FIG. 1 may be used to facilitate the distribution of media stream segments via broadcast and unicast. Media stream segments may be created in and/or transmitted from the live source 102 and distributed to the unicast server 104 as well as a broadcast distribution server 106. A user device may receive content from the broadcast server, as shown in configuration 108*a*, as well as the unicast server, as shown in configuration 108*b*, in different periods of time or in different locations, one server may be more accessible or desirable than another server depending on factors such as the accessibility of the different servers, the cost of receiving data from the different servers; and/or the latency associated with communicating with the different servers. The user device includes a buffer 110, a unicast agent 112, a broadcast receiver 114, a display 116, and a decoder 118.

At 102, a live content source 102 is shown. According to various embodiments, the live content source 102 may be operable to provide data representing a media item for presentation at a client machine, which is also referred to herein as a user device. The data representing the media item may be provided to the client machine as a media stream. The client machine may be operable to present the client machine in real time for consumption by a user. The live content source 102 may be a content provider, a content distributor, or any other source of content.

According to various embodiments, the media stream may be separated into a plurality of media stream fragment, as is discussed herein. The media stream fragments may be created in sequential order or in any other order.

According to various embodiments, a media stream may include various types of information. For example, a media stream may include one or more audio tracks, video tracks, closed captioning information, video subtitles, pictures, picture albums. As another example, a media stream may include one or more uniform resource locators or other mechanisms for locator or accessing content.

At 104, a unicast server is shown. According to various embodiments, the unicast server may communicate with client devices via one or more unicast transport types. For example, the unicast server may communicate with client devices via HTTP. According to various embodiments, techniques described herein may be used in conjunction with various types of unicast transmission technology, such as HSPA, CDMA2000, LTE, LTE Advanced, and variants of IEEE 802.11.

According to various embodiments, the unicast server may receive the media stream segments from the content source 102. The media stream segments may be stored at the unicast server. Then, the media stream segments may be transmitted to the client device upon request.

At 106, a broadcast server is shown. According to various embodiments, techniques described herein may be used in conjunction with various types of broadcast technology using streams or files for transmission, such as DVB-H, ATSC-M/H, MediaFlo. The broadcast server may be, for example, a broadcast multicast service center (BMSC) in a 3GPP network. As another example, the broadcast server may be configured to transmit information via messages in accordance with the multimedia broadcast multicast services (MBMS) specification.

At 108a, a user device is shown in a configuration in which the device is receiving content via the broadcast node 106. At 108b, the user device is shown in a configuration in which the device is receiving content via the unicast node 104, in either case, the client may store the received fragments in the media stream fragment buffer 110. These fragments may then be decoded by the decoder 118 and displayed via the display 116.

According to various embodiments, the media stream fragment buffer 110 may store media fragments received from the unicast server 104 and/or the broadcast server 106. The fragments stored in the buffer 110 may include those fragments that have not yet been transmitted for decoding and presentation via the display 116. Alternately, fragments may continue to be stored in the buffer 110 after they have been decoded for presentation.

At 112, a unicast communication module is shown. According to various embodiments, the unicast communication module may be any combination of computer software and/or hardware configured to transmit, receive, and process communications with the unicast server 104. For example, the unicast communication module may be an HTTP agent configured to communication via the HTTP protocol.

At 114, a broadcast communication module is shown. According to various embodiments, the broadcast communication module may be any combination of computer software and/or hardware configured to receive and process transmissions from the broadcast server 106. For example, the broadcast communication module may be configured to receive broadcasts transmitted from a BMSC node via the FLUTE protocol.

At 116, a display 116 is shown. According to various embodiments, the display 116 may be used to present the content received from the live content source 102. The display 116 may include one or more of a display screen, a speaker, or any other device for presenting content to a user.

According to various embodiments, the display 116 may receive content by way of a decoder 118. As is discussed herein, content may be encoded during transmission to the client machine. Accordingly, the decoder 118 may reverse the process, decoding the content for presentation via the display 116.

According to various embodiments, delay is intentionally introduced into the broadcast server 106. In some examples, the third latest segment is broadcast. However, delays of other lengths may also be used, as discussed herein. The specific delay used may be strategically determined based on factors such as the media stream fragment size, the data rate used when communicating with the client device, and the capabilities of the network.

Increasing the delay may provide a larger margin, which may provide greater insurance against service interruptions or transport-type switches. However, increasing the delay may require that the media stream buffer 110 store additional media stream segments, since the buffer stores at least the media stream segments that make up the delay in order to allow seamless switching from unicast to broadcast.

According to various embodiments, when delay is introduced, segments may not be broadcast as soon as they are available, but instead may be buffered in the Bode in such a way that they are delayed relative to the unicast fragment server. Alternately, or additionally, the segments may be delayed when transmitted from the content source 102 to the broadcast server 106. In some cases, a buffering delay may be introduced at the content source, while additional relative delay may be introduced at the broadcast server so that the unicast fragment server has less delay than the broadcast server. In this way, segment reception by a client device via a unicast agent may be somewhat ahead of the broadcast reception.

Since the unicast reception of media stream segments is somewhat ahead of the broadcast session, it is easy to switch from unicast to broadcast reception without missing media stream segments in the reception buffer. For example, if the client is in the state shown in the client device configuration 108b, it already has the currently broadcasted segment n−1 in the buffer, so it does not matter that it cannot receive packet n−1 as it is broadcasted. The next segment being broadcasted, segment n, will be fully received and an uninterrupted sequence of segments will be in the buffer.

A transition from broadcast to unicast may happen abruptly when, for example, the client device leaves a broadcast-enabled area. If the client device is in the state depicted in configuration 108a, for example, the client device, it will not receive the full segment n−1 via broadcast. However, the segment n−1 is available on the unicast server, so the client can fetch it from there. Thus, broadcast to unicast switching may be handled without interruption, provided that the network conditions are sufficient. To avoid an interruption when going back to broadcast mode later on, the client may fetch additional segments via unicast to get ahead of the broadcast transmission again.

In particular embodiments, client development separates the design of the application-specific code from the content presentation layer (e.g., the audio and/or video player). Common content presentation interfaces provide controls for play, pause, seek, and/or other operations. The platforms may also allow the propagation of error information and some types of quality feedback.

According to various embodiments, systems may be configured to support the interaction of the media player and converged applications. Some embodiments may facilitate feedback to the application and/or the ability of the content acquisition application to control player playback. These operations may in some embodiments be accomplished through the use of the following feedback APIs; the reception strengths for a broadcast and/or unicast network; an identifier corresponding to the most recent segment received by the content acquisition system; an identifier corresponding to the most recent segment played by the media player; a value corresponding to active transport and/or events when transport changes; a value corresponding to active template and/or events when template changes; a value corresponding to the available bandwidth; metadata information (e.g., files transferred in the FLUTE alongside segments that provide program information that can be synchronized with the playing video.)

In particular embodiments, in order to facilitate the appropriate synchronization of the BC and UC transport-type distributions, the client clock may be synchronized with the segment generator clock. Then, the download of segments ma be controlled by the latest manifest file, which provides enough information to programmatically generate segment URLs, and one or more values specified in the manifest file, such as the availability start time. In this case, the latest live segment may be calculated by adding the durations of the individual segments. However, even if the clocks are not well synchronized, the unicast media segment retrievals can get ahead of the broadcast transmission by trying to fetch segments as early as possible, until no more recent segments are available.

In particular embodiments, for example in MBMS, the network announces that files are available via MBMS download through an MBMS User Service Description (USD). The USD may include a manifest. Which may be a Media Presentation Description (MPD), for example via the mediaPresentationDescription reference. The manifest may indicate that an MPD may be delivered via the MBMS Download service. The same MPD can also be made available via HTTP. Other types of networks may facilitate similar configurations.

An example URL that may correspond to a media stream segment is: "http://cdn1.example.com/SomeMovie_1400kbps_00001.ts". This URL may correspond to first media stream segment of the content "SomeMovie" with a data rate of 14000 kbps.

If, for example, the availability start time is 2011-05-10T06:16:42 and the time is 07:20:01, then the time 01:03:19 (corresponding to 3799 s) has passed. Since the first segment was available, and with the segment duration of 4 s, the segment 700 shall be the last available. This is the one that the HTTP client should fetch, while the MBMS delivery is delayed so that segment an older segment, such as 698 is delivered.

An example of a template-based MPD for live content using the MPEG-2 Transport Stream (TS) protocol is available in Section G.3 in Part 1 of the MPEG specification for DASH (IOS/IEC IS 23009-1). One example of a description of such content is provided below.

```
<?xml version="1.0" encoding="UTF-8"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011"
  type="static"
  mediaPresentationDuration="PT6158S"
  availabilityStartTime="2011-05-10T06:16:42"
  minBufferTime="PT1.4S"
  profiles="urn:mpeg:profile:dash:m2ts-simple"
  maxSegmentDuration="PT4S">
  <BaseURL>http://cdn1.example.com/</BaseURL>
  <BaseURL>http://cdn2.example.com/</BaseURL>
  <Period id="42" duration="PT6158S">
    <AdaptationSet
      mimeType="video/mp2t"
      codecs="avc1.4D401F,mp4a"
      frameRate="24000/1001"
      segmentAlignment="true"
      subsegmentAlignment="true"
      bitstreamSwitching="true"
      startWithSAP="2"
      subsegmentStartsWithSAP="2">
      <ContentComponent contentType="video" id="481"/>
      <ContentComponent contentType="audio" id="482" lang="en"/>
```

-continued

```
      <ContentComponent contentType="audio" id="483" lang="es"/>
      <BaseURL>SomeMovie_</BaseURL>
      <SegmentTemplate
        media="$RepresentationID$_$Number%05$.ts"
        index="$RepresentationID$.sidx"
        initialisation="$RepresentationID$-init.ts"
        bitstreamSwitching="$RepresentationID$-bssw.ts"
        duration="4"
        startNumber="1"/>
      <Representation id="720kbps" bandwidth="792000" width="640" height="368"/>
      <Representation id="1130kbps" bandwidth="1243000" width="704" height="400"/>
      <Representation id="1400kbps" bandwidth="1540000" width="960" height="544"/>
      <Representation id="2100kbps" bandwidth="2310000" width="1120" height="640"/>
      <Representation id="2700kbps" bandwidth="2970000" width="1280" height="720"/>
      <Representation id="3400kbps" bandwidth="3740000" width="1280" height="720"/>
    </AdaptationSet>
  </Period>
</MPD>
```

Figure 2:
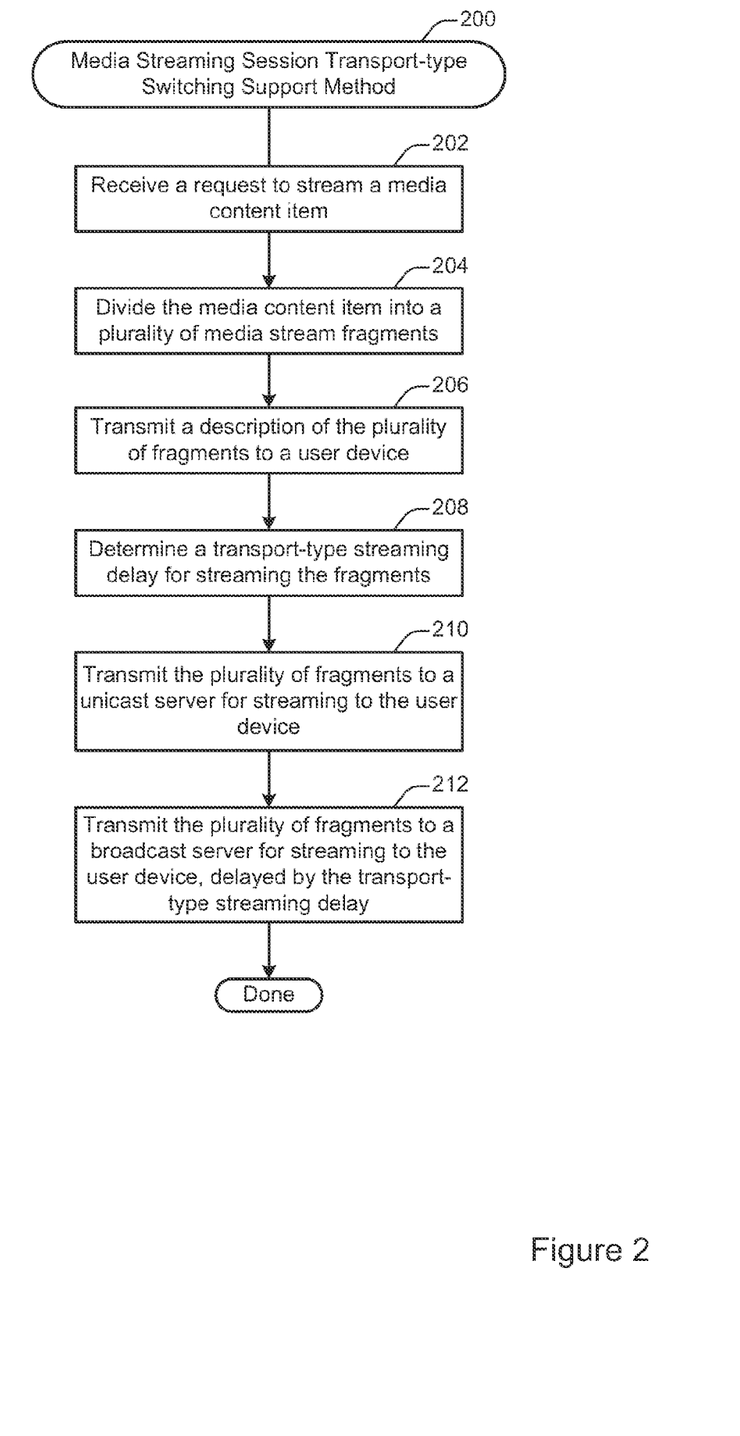
FIG. 2 illustrates one technique for supporting media streaming session transport-type switching.

FIG. 2 illustrates a method 200 for supporting media streaming session transport-type switching. According to various embodiments, the method 200 may be performed in a system similar to that described with reference to FIGS. 1 and 4. That is, a client machine may be receiving a media stream from a content provider. The media stream may be provided by way of at least two different transport types. Content sent via these two transport types may be provided via the same physical server or may be provided via different physical servers. In FIG. 2, the two transport types are described as unicast and broadcast. However, according to various embodiments, as described herein, a variety of transport types may be used.

At 202, a request to stream a media content item is received. According to various embodiments, the request may be received at a server, such as a server controlled by a content provider. The media content may be audio, video, subtitles, or other content that can be presented at a user device. The media content may be one or more continuous pieces of content, such as a movie, a song, or an album of songs. Alternately, the media content may be one or more discrete pieces of content, such as a picture or an album of pictures. In either case, the media content may be accessed individually or as part of an ongoing stream of content, such as a television or radio station.

At 204, the media content item is divided into a plurality of media stream fragments. By dividing the content into fragments, the content may be transmitted to the user device piecemeal rather than as a single lame file. This process may allow the transmission of live content to the client machine since the content may be sent and presented as it is being created. Alternately, or additionally, this process may allow the client machine to perform adaptation whenever a new fragment is downloaded.

According to various embodiments, the user device may begin presenting the content as soon as the first fragment is received rather than waiting to receive all of the data associated with the content. Also, the user device may need to store only a limited amount of data instead of all of the data associated with the content. In some instances, dividing the content into fragments may facilitate the receipt of a media stream at more limited devices (e.g., mobile devices) than would be practical when sending the content as a unified whole. In particular embodiments, the streaming process may facilitate easier digital rights management and content protection than transmitting an entire file.

According to various embodiments, the media may be divided into fragments by a computing device such as a fragmentation system. One example of a fragmentation system is described with respect to FIG. 2. The fragmentation system may be controlled by the content provider, the operator of the broadcast and/or unicast servers, or any other party.

At 206, a description of the plurality of fragments is transmitted to the user device. According to various embodiments, the description of the plurality of fragments may identify one or more uniform resource locators (URLs) or other identifiers for retrieving the media stream fragments. The identifiers may be transmitted in a list or may be transmitted as a template. The description of the plurality of fragments may be transmitted by the content provider, by the unicast server, by the broadcast server, or by a different device on the network.

According to various embodiments, the description of the plurality of fragments may include different identifiers or different identifier template values for allowing the client device to retrieve fragments at different data rates, resolutions, fragment sizes, or other parameter values. For example, the description may include information for retrieving media stream fragments at 720 kilobytes per second (kbps), 1130 kbps, 1400 kbps, 2100 kbps, 2700 kbps, or 3400 kbps.

At 208, a transport-type streaming delay for streaming the fragments is determined According to various embodiments, the transport-type streaming delay may be imposed for one transport-type relative to another transport-type. For example, media stream fragments sent via broadcast may be delayed relative to media stream fragments sent via unicast. In this way, a user device switching mid-session from unicast to broadcast can be sure to receive, via the broadcast server, the next media stream fragment that has not yet been received by the user device. That is, if the user device suddenly loses access to the unicast server, for example half-way through receiving a media stream fragment, the user device can switch over to the broadcast server and pick up the media stream a short period later.

According to various embodiments, the transport-type streaming delay may be specified as a designated number of fragments, a designated period of time, a designated data size, or any other metric for specifying a transmission difference between the two transport types. In particular embodiments, the transport-type streaming delay may be a designated number of fragments between one and ten. For example, the transport-type streaming delay may be two fragments.

At 210, the plurality of fragments are transmitted to a unicast server for streaming to the user device. A unicast server was described with respect to block 116 shown in FIG. 1. As described with respect to FIG. 1, the unicast server may transmit media stream fragments to a user device upon request.

At 212, the plurality of fragments are transmitted to a broadcast server for streaming to the user device. When transmitted by the broadcast server, the media stream fragments are delayed relative to those transmitted by the unicast server in accordance with the transport-type streaming delay.

According to various embodiments, the transport-type streaming delay may be imposed at different locations in the system. For example, the content provider may send the media stream fragments to the broadcast server after a delay relative to sending the media stream fragments to the unicast server. As another example, the content provider may send the media stream fragments to the two servers at approximately the same rate and time, while the broadcast server buffers the fragments and imposes the delay.

According to various embodiments, the transport-type streaming delay may be imposed in various ways. For example, the broadcast server may receive an indication from the unicast server that the unicast server has received a request for a designated media stream fragment. Then, the broadcast server may delay broadcasting the designated media stream fragment in accordance with the transport-type streaming delay. As another example, the broadcast server may not begin broadcast until it receives an indication that the user device has requested to receive content via the broadcast server. Then, the broadcast server may broadcast a designated media fragment identified by the unicast server, delayed by the streaming delay.

According to various embodiments, the media stream fragments may be transmitted incrementally to one or both of the unicast and broadcast servers. That is, media stream fragments may be transmitted sequentially so that one or both of the servers may begin streaming to the client device before receiving all of the media stream fragments. Transmitting all of the media fragments at once may be desirable in some system configurations, such as when some or all of the servers are not located in close physical proximity or are separated by a network such as the internet.

According to various embodiments, all of the media stream fragments may be transmitted to one or both of the servers before the servers begin transmitting to the client device. For instance, media stream fragments may be transmitted in this way for pre-recorded content. Transmitting all of the media fragments at once may be desirable in some system configurations, such as when some or all of the servers are located in close physical proximity or in the same physical machine.

According to various embodiments, operations not shown in FIG. 2 may be performed as part of supporting transport-type switching within a media streaming session. Alternately, or additionally, not all of the operations shown in FIG. 2 need be performed in every instance. For example, the media content item may be already divided into a plurality of fragments well before receiving a request to stream the content.

Figure 3:
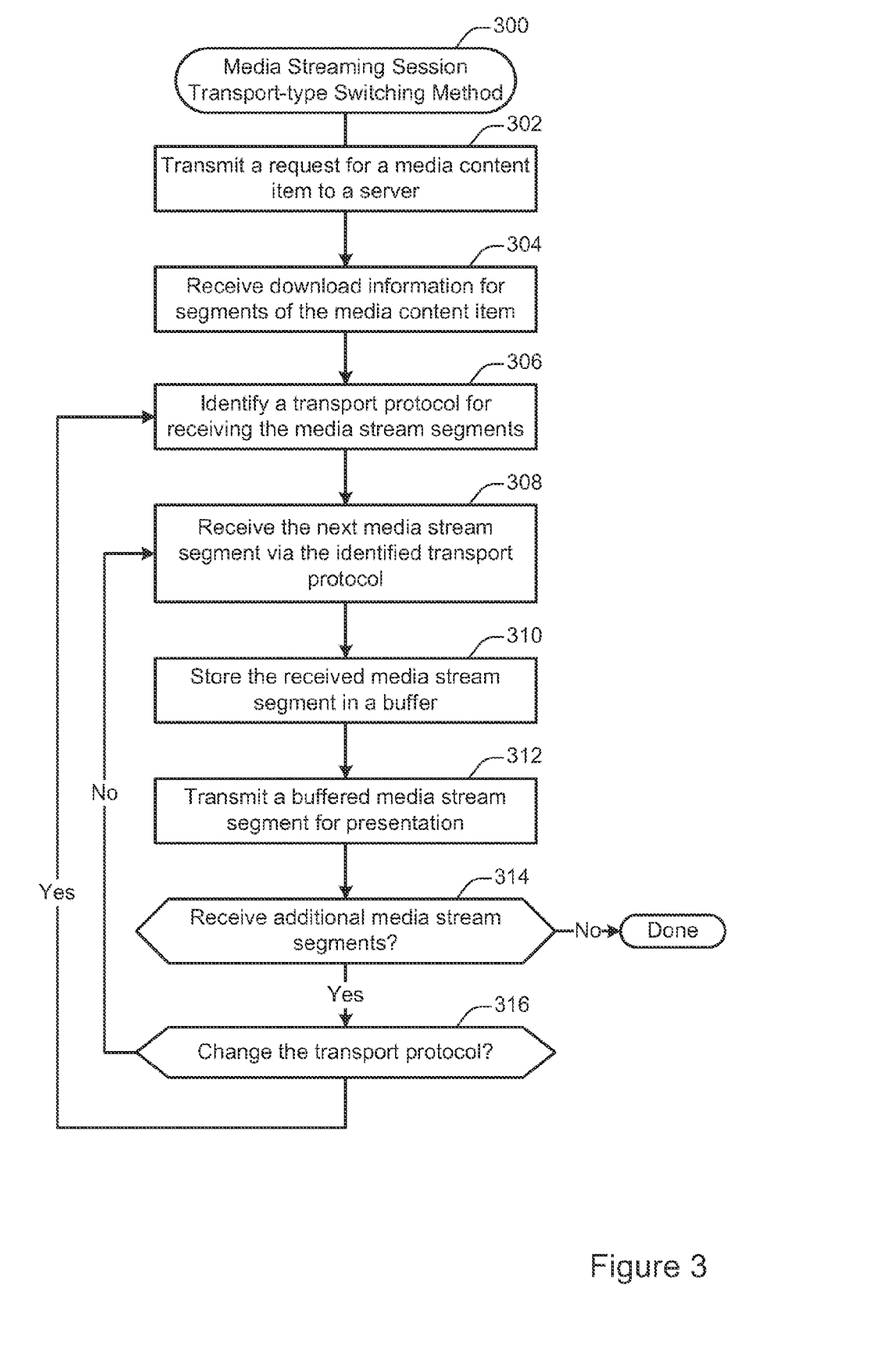
FIG. 3 illustrates one technique for supporting switching the transport-type of a media streaming session.

FIG. 3 illustrates a method 300 for supporting switching the transport-type of a media streaming session. According to various embodiments, the method 300 may be performed at a client device, such as a client device in configurations 108*a* and 108*b* shown in FIG. 1. The client device may be in communication with a broadcast and/or unicast server, such as the servers 104 and 106 shown in FIG. 1. The method 300 may be performed primarily or entirely in an application layer residing at the client device, such as an application layer that includes the unicast communication module 112, a broadcast communication module 114, a media segment buffer 110, and/or any other hardware and/or software for performing the method.

At 302, a request for a media content item is transmitted to a server. As described herein the media content item may be one or more discrete pieces of content or an ongoing stream of content, such as a television or radio station. According to various embodiments, the request for media content may be transmitted from the client device. Alternately, or additionally, the request for media content may be transmitted from another machine in communication with the client device, such as a machine configured to select content for display on the client device.

According to various embodiments, the request for media content may be transmitted to a content source, such as the content source 102 shown in FIG. 1. Alternatively, or additionally, the request for media content may be transmitted, to a unicast server, a broadcast server, or any other networked destination configured to initiate the provision of content for the client device.

At 304, download information for segments of the media content item is received. As described with respect to FIG. 1, the download information may include any description of identifiers or locators for the media segments. For example, the download information may include a MBMS User Service Description (USD), which may include a Media Presentation Description (MPD). The download information may include individual URLs or URL templates that correspond to the media stream segments. The download information may be received from the content provider, the unicast server, the broadcast server, or any other machine in communication with the client device via a network.

At 306, a transport protocol for receiving the media stream segments is identified. According to various embodiments, the transport protocol may be any protocol supported by the network via which the user device is communicating. For example, the user device may be located in an area that supports unicast communication via HTTP but does not support broadcast communication. As another example, the user device may be located in an area that supports broadcast communication but does not support unicast communication.

According to various embodiments, if more than one transport protocol is available, then the identified protocol may be chosen in various ways. For example, a server may be selected based on low latency, stability, data rate, or other factors. As another example, one protocol (e.g., broadcast) may be preferred to another protocol (e.g., unicast) if both are available.

At 308, the next media stream segment is received via the identified transport protocol. According to various embodiments, the media stream segment may be received by a communications module, such as a broadcast or unicast communications module, located in the client device and configured to communicate via the identified transport protocol.

According to various embodiments, the media stream segments may be received in sequential or near sequential order. That is, the media stream segments may be broadcast sequentially by the broadcast server if in broadcast mode. Similarly, the media stream segments may be requested and received sequentially from the unicast server when in unicast mode. However, the media stream segments may in some instances be received in an order not entirely sequential, for example if the network is congested.

At 310, the media stream segment is stored in a buffer. Storing the media stream segment in a buffer before playing it may help insure seamless playback of the media stream. For example, if the transport protocol is switched or network service is temporarily interrupted, the next media stream segment may not be received at the anticipated time. If the media stream segments are buffered, then the next unplayed media stream segment may be retrieved from the buffer for playback even if a problem arises in retrieving the next unbuffered media stream segment via the network.

A 312, a buffered media stream segment is transmitted for presentation. In particular embodiments, as described with respect to FIG. 1, a fragment in the media stream buffer may first be decoded by a decoder and then rendered on a display. According to various embodiments, a media player at the client device may include a buffer, a decoder, and a rendering unit.

Although FIG. 3 shows a media stream segment being transmitted after another media stream segment is received and stored in the buffer, this ordering used only for explanatory purposes, and an actual client device may perform these steps in a different order. That is, the next unplayed media stream segment is played immediately after the currently playing media stream segment finishes if playback is to continue uninterrupted. Further, although media stream segments are received at a rate at least equivalent to the playback rate if playback is to continue uninterrupted, in some cases the receipt of the media stream segments may be somewhat busty, for instance if the network is congested. Thus, the client device may in some cases receive and buffer several media stream segments while a single segment is being played. In other cases, the client device may play several segments without receiving and buffering a new media stream segment, for instance when switching transport protocols.

According to various embodiments, the rates of receipt and playback of media stream segments will be similar on average when network conditions are sufficient for uninterrupted streaming playback. For example, the rates may be similar when presenting a live media feed at the client device. In particular embodiments, the rates may be different. For instance, when receiving video on demand content, a user or device could choose to download the full content even faster than real time.

At 314, a determination is made as to whether to receive additional media stream segments. According to various embodiments, media segments may continue to be received while network conditions are sufficient and while additional media segments are available. For example, the download information received in operation 304 may identify a finite number of media stream segments. Accordingly, the media stream segments may be received until no further segments remain. As another example, a determination may be made that network conditions no longer support streaming of the media content. For instance, wireless signal strength may be low, or a wireless network may not be present. As yet another example, the client device may receive user input (e.g., a pause or stop button click) indicating that the playback should be halted.

At 316, a determination is made as to whether to change the transport protocol. According to various embodiments, various considerations may affect this determination. For example, the factors discussed with respect to operation 306 may be reevaluated to account for changing conditions. As another example, the transport protocol used to receive the most recent media fragment may be unavailable. One scenario in which the transport protocol may be changed may be when a client device moves to a different area that is covered by a wireless network in which the previously-used protocol is not supported.

Figure 4:
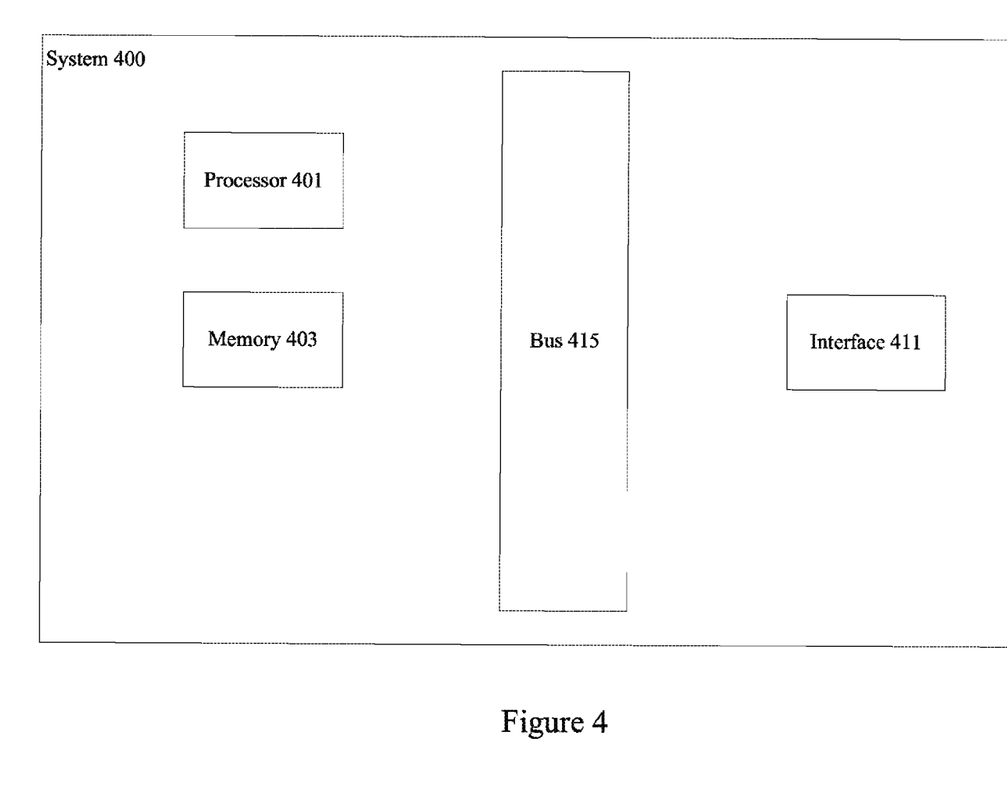
FIG. 4 illustrates one example of a system that can be used with various techniques and mechanisms of the present invention.

FIG. 4 illustrates one example of a server. According to particular embodiments, a system 400 suitable for implementing particular embodiments of the present invention includes a processor 401, a memory 403, an interface 411, and a bus 415 (e.g., a PCI bus or other interconnection fabric) and operates as a streaming server. When acting under the control of appropriate software or firmware, the processor 401 is responsible for modifying and transmitting live media data to a client. Various specially configured devices can also be used in place of a processor 401 or in addition to processor 401. The interface 411 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 400 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verities the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included, within the scope of invention.

What is claimed is:

1. A method comprising:
   receiving a media stream from a content provider at a unicast server and at a broadcast server, the media stream comprising a plurality of media stream fragments;
   introducing a transport-type streaming delay into the media stream at the broadcast server, wherein media stream fragments transmitted from the broadcast server are delayed relative to media stream fragments transmitted from the unicast server, the media stream including a first fragment transmitted from the broadcast server after it is transmitted from the unicast server;
   wherein the unicast server is operable to store the media stream fragments received from the content provider, and wherein the unicast server is further operable to provide the stored media stream fragments to the user device upon request;
   wherein the transport-type streaming delay corresponds to a designated number of the media stream fragments transmitted via unicast and broadcast; and
   transmitting the media stream fragments to a user device, wherein the user device is operable to switch between receiving the media stream fragments from the unicast server and the broadcast server without interrupting a presentation of the media stream on the user device.

2. The method recited in claim 1, wherein switching between receiving the media stream fragments from the unicast server and the broadcast server comprises:
   determining, at the user device, that the broadcast server is no longer available; and
   receiving, at the unicast server, a request from the user device to receive one or more of the media stream fragments.

3. The method recited in claim 1, wherein switching between receiving the media stream fragments from the unicast server and the broadcast server comprises:
   determining, at the user device, that the broadcast server is available; and
   receiving, at the user device, one or more of the media stream fragments broadcast by the broadcast server.

4. The method recited in claim 1, wherein the user device is operable to maintain a media fragment buffer operable to store a designated number of the media stream fragments, and wherein the user device is operable to present media fragments stored in the media fragment buffer while switching between receiving the media stream fragments from the unicast server and the broadcast server.

5. The method recited in claim 1, wherein the transport-type streaming delay corresponds to a designated time period.

6. The method recited in claim 1, wherein the media stream is available to be received by the user device at a plurality of data rates, the method further comprising:
   receiving, from the client machine, a message designating a data rate at which to receive the media stream.

7. The method recited in claim 1, wherein the media stream comprises audio or video content selected from the group consisting of: video subtitles, closed captioning, a plurality of alternate audio tracks, and a plurality of alternate video tracks.

8. A system comprising:
   a unicast server including memory, a network interface, one or more processors, the unicast server being configured to:
   receive a media stream from a content provider, the media stream comprising a plurality of media stream fragments, and
   transmit the media stream fragments to a user device; and
   a broadcast server including memory, a network interface, and one or more processors, the broadcast server configured to:
   receive a media stream from a content provider, the media stream comprising the plurality of media stream fragments,
   introduce a transport-type streaming delay into the media stream, wherein media stream fragments transmitted from the broadcast server are delayed relative to media stream fragments transmitted from the unicast server,
   wherein the unicast server is operable to store the media stream fragments received from the content provider, and wherein the unicast server is further operable to provide the stored media stream fragments to the user device upon request,
   wherein the transport-type streaming delay corresponds to a designated number of the media stream fragments transmitted via unicast and broadcast, and
   transmit the media stream fragments to a user device, the media stream including a first fragment transmitted from the broadcast server after it is transmitted from the unicast server, wherein the user device is operable to switch between receiving the media stream fragments from the unicast server and the broadcast server without interrupting a presentation of the media stream on the user device.

9. The system recited in claim 8, wherein switching between receiving the media stream fragments from the unicast server and the broadcast server comprises:
    determining, at the user device, that the broadcast server is no longer available; and
    receiving, at the unicast server, a request from the user device to receive one or more of the media stream fragments.

10. The system recited in claim 8, wherein switching between receiving the media stream fragments from the unicast server and the broadcast server comprises:
    determining, at the user device, that the broadcast server is available; and
    receiving, at the user device, one or more of the media stream fragments broadcast by the broadcast server.

11. The system recited in claim 8, wherein the user device is operable to maintain a media fragment buffer operable to store a designated number of the media stream fragments, and wherein the user device is operable to present media fragments stored in the media fragment buffer while switching between receiving the media stream fragments from the unicast server and the broadcast server.

12. One or more non-transitory computer readable media having instructions stored thereon for performing a method, the method comprising:
    receiving a media stream from a content provider at a unicast server and at a broadcast server, the media stream comprising a plurality of media stream fragments, each of the plurality of media stream fragments being transmitted by both the unicast server and the broadcast server;
    introducing a transport-type streaming delay into the media stream at the broadcast server, wherein media stream fragments transmitted from the broadcast server are delayed relative to media stream fragments transmitted from the unicast server, the media stream including a first fragment transmitted from the broadcast server after it is transmitted from the unicast server;
    wherein the unicast server is operable to store the media stream fragments received from the content provider, and wherein the unicast server is further operable to provide the stored media stream fragments to the user device upon request;
    wherein the transport-type streaming delay corresponds to a designated number of the media stream fragments transmitted via unicast and broadcast; and
    transmitting the media stream fragments to a user device, wherein the user device is operable to switch between receiving the media stream fragments from the unicast server and the broadcast server without interrupting a presentation of the media stream on the user device.

13. The one or more non-transitory computer readable media recited in claim 12, wherein switching between receiving the media stream fragments from the unicast server and the broadcast server comprises:
    determining, at the user device, that the broadcast server is no longer available; and
    receiving, at the unicast server, a request from the user device to receive one or more of the media stream fragments.

* * * * *